United States Patent Office 3,368,635
Patented Feb. 13, 1968

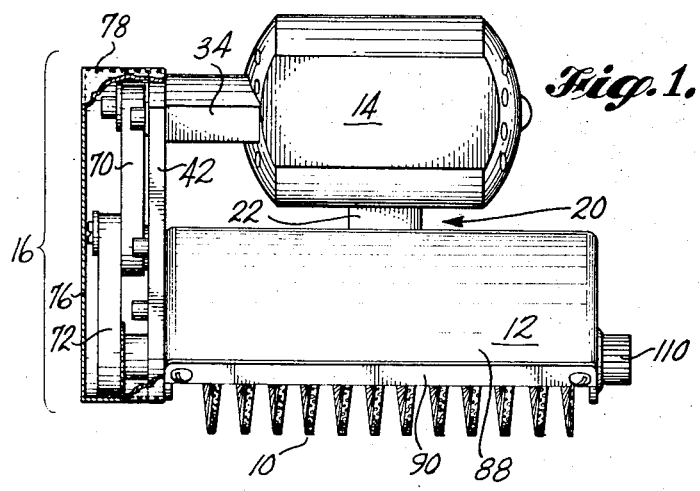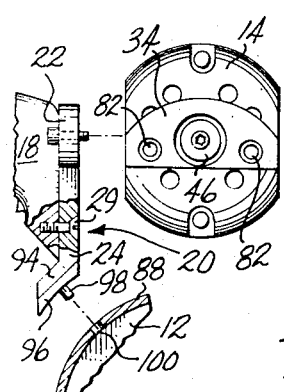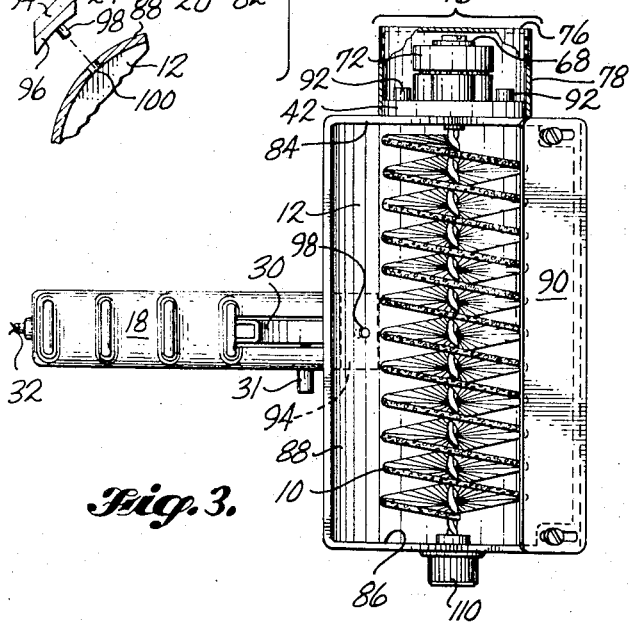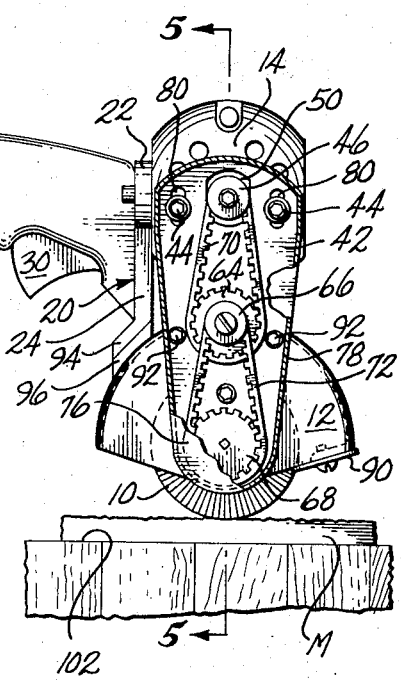

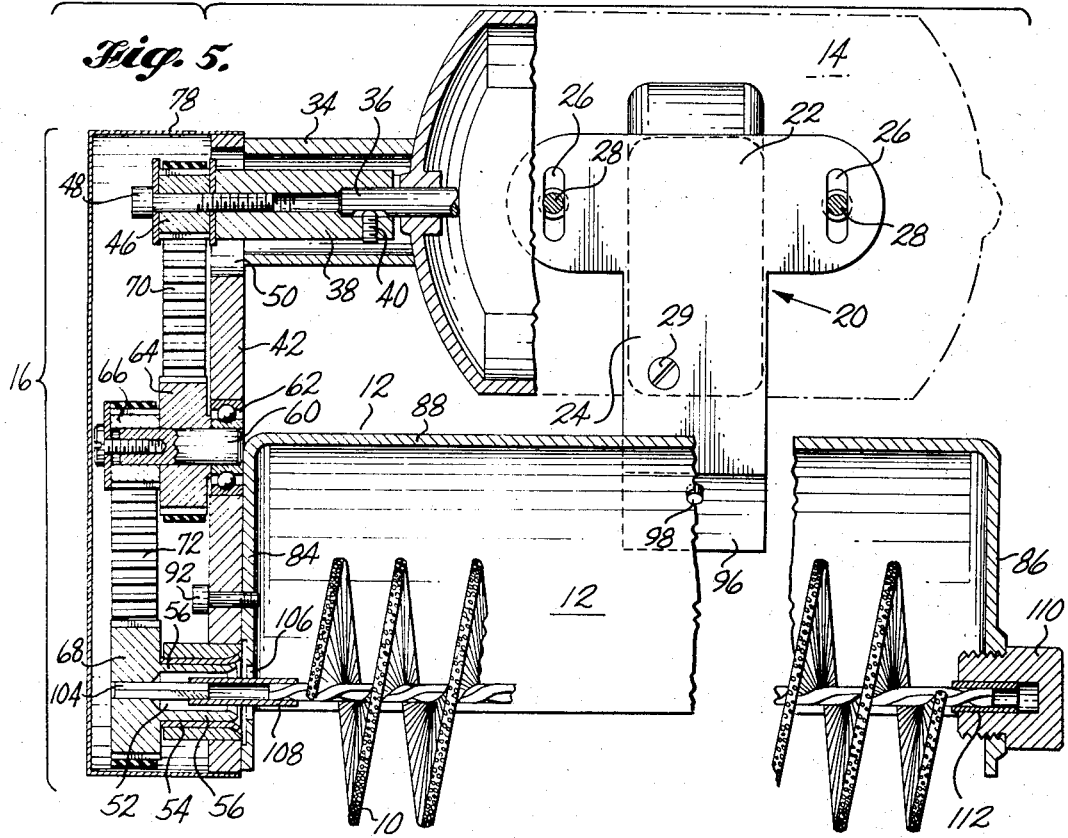
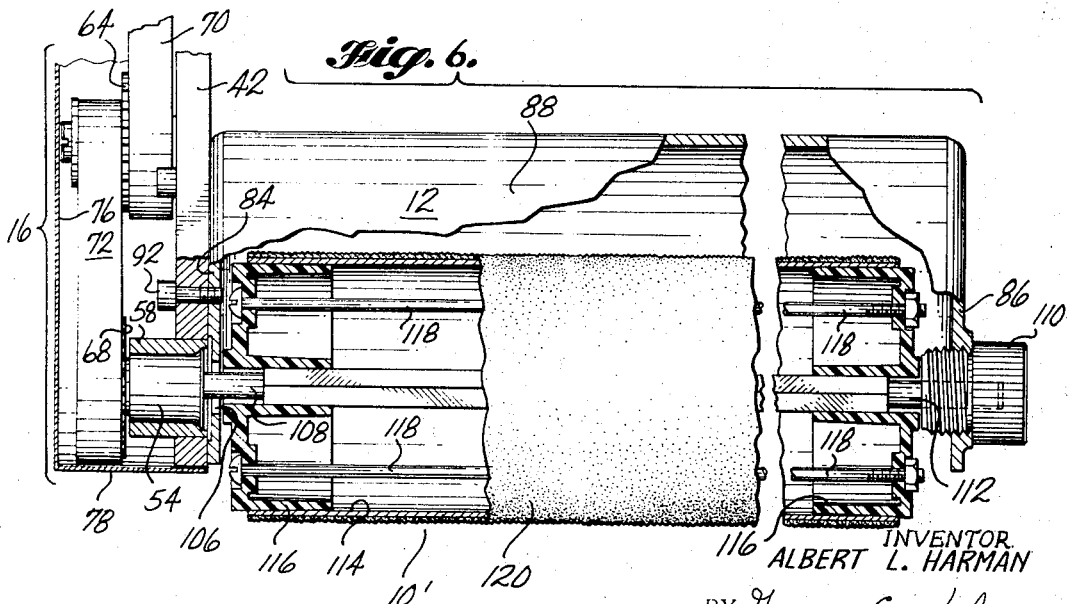

3,368,635
PORTABLE ROTARY POWER TOOLS
Albert L. Harman, Box 92, Corvallis, Oreg. 97330
Filed Mar. 2, 1966, Ser. No. 531,304
9 Claims. (Cl. 173—163)

The present invention relates to power tools, and more particularly to portable power tools having rotary working elements or tools of cylindrical proportions, e.g. rotary brush meat cleaners, drum sanders, rust chippers, burnishers, and polishers.

Portable rotary power tools according to the present invention comprise a power assembly including an electric motor, transmission means for transmitting rotary motion from the motor shaft to a parallel shaft of a working element or tool spaced forwardly of the motor, and a full grip handle equipped with a trigger on-off control switch; a shield that is readily attachable to and detachable from the power assembly; and a working element tool of cylindrical proportions that is easily insertable into and removable from its position of use within the shield at which time it is drivingly coupled to the motor by the transmission means.

A particularly important feature of the present invention is the relative arrangement and manner of interconnection of the power tool components, resulting in a portable power tool that has the advantages of being lightweight but structurally solid, readily disassemblable for cleaning and other maintenance of its parts, and inexpensive to manufacture.

The structural solidarity is built around a generally centrally located support member, hereinafter referred to as a "tie plate." The tie plate serves as a connecting link between the handle and the motor and transmission assembly, and also serves as a "backstay" for the shield. In preferred form, the tie plate is generally T-shaped, and is composed of a stem and a cross arm. The free end of the stem is angularly offset with respect to the remainder of the stem, and such angular offset portion forms the backstay for the shield. The electric motor is separately encased, and is located on the side of the tie plate away from which the backstay deviates. The handle is on the opposite side of the tie plate, and extends generally perpendicular to the motor axis and generally normal to the major portion of the tie plate. The motor may be secured in place by machine screws extending through the cross arm of the tie plate and threading into the motor casing, and the handle may be secured in place by one or more machine screws extending the opposite direction through the tie plate and threading into the top portion of the handle. A hollow mounting block is rigidly secured to one end of the motor casing in surrounding relationship to the motor's output shaft. The transmission includes a support arm rigidly secured to the end of the mounting block opposite the motor, a rotary chuck journaled at the end of the support arm distal the mounting block, and belt and pulley means drivingly connecting the output shaft of the motor with the rotary chuck. The support arm extends radially outwardly from the output shaft, generally ninety degrees (90°) about the motor and output axis from the handle, and also is generally parallel with the tie plate. The shield, which is composed of a pair of generally semi-circular end walls and a generally semi-cylindrical rear wall interconnected therebetween, is preferably connected to the power assembly only by machine screws interconnecting between the support arm of the transmission and one of the end walls of such shield. The backstay includes a forward surface matching the curvature of the shield's rear wall, and is in surface-to-surface contact with the rear wall. A locating pin is carried by either the backstay or the rear wall of the shield, and the other of such elements includes an opening for snugly receiving and engaging the locating pin.

Another object of the present invention is to provide a portable power meat cleaner of the character described, in which the working element or tool is a brush with relatively stiff fiber or hair bristles, and the shield includes a cleaning blade longitudinally spanning the brush emergent side of the shield opening. Conventional hand held power meat cleaners, such as disclosed by my U.S. Patent No. 2,959,797, issued Nov. 15, 1960, and entitled Meat Cleaner, comprise a motor that is mounted on or to one side of the meat block, and a remote brush and shield assembly drivingly connected with the motor by a flexible drive shaft. The brush and shield assembly includes a handle, and the on-off switch for the motor is located on or near the motor, remote from the handle. In a portable power meat cleaning tool constructed according to the present invention, the on-off switch is positioned adjacent the index finger of the hand which holds the tool.

Other objects and advantages will be apparent from the following description, appended claims, and annexed drawing.

Referring to the drawing wherein like reference characters designate like parts throughout the several views, and wherein all views are approximately to scale:

FIG. 1 is a front elevational view of a portable power meat cleaner, typifying the present invention, with the front portion of its transmission cover cut away and its drive means exposed;

FIG. 2 is an end elevational view of such power tool, looking toward the power transmission, with most of the end wall portion of the transmission cover cut away, such view clearly showing the details of the drive means, and the manner in which the support arm is mounted on the mounting block, for permitting tension adjustment of the first drive belt;

FIG. 3 is a bottom plan view of the power tool, with the lower portion of the transmission cover cut away, and the lower portion of the drive train exposed;

FIG. 4 is an exploded view taken from the same aspect as FIG. 2, but with the transmission removed and the end surface of the mounting block exposed, and including only fragmented portions of the handle and the shield;

FIG. 5 is a sectional view, on a larger scale than FIGS. 1–3, taken generally along line 5—5 of FIG. 2, with the brush and shield fragmented, and with the greater portion of the motor shown in phantom; and FIG. 6 is a view taken from the same aspect as FIG. 5, but with the upper portion of the transmission and the motor omitted, and showing a polishing tool in place of the cleaning brush.

The typical embodiment of the invention illustrated by the drawing will now be specifically described.

Referring first to FIGS. 1–3, the power tool is shown to comprise a rotary brush 10 of cylindrical proportions; a generally semi-cylindrical shield 12; and a power assembly composed of a motor 14, a power transmission 16, and a handle 18.

The motor 14 and the handle 18 are structurally interconnected or integrated by a tie plate 20. As best shown by FIG. 4, the tie plate 20 may be generally T-shaped, and be composed of a cross arm 22 and a stem 24. The cross arm 22 may be provided with apertures 26 for the reception of machine bolts 28 used for securing the motor 14 to the cross arm 22. As illustrated in FIG. 5, the apertures 26 may be elongated slots extending parallel to each other and transversely of both the cross arm 22 and the axis of the motor 14. As will be evident, the slots permit adjustment of the motor's position on the cross arm 22.

As best shown by FIG. 2, the handle 18 is positioned generally directly opposite the motor 14 on the side of the tie plate 20 opposite the motor 14. The handle 18 is shown to contact the midportion of the cross arm 22, and to be connected to the stem by a screw 29. The handle 18 extends generally normal to the cross arm 22. The tie plate 20 may be manufactured separate from the handle 18, and then secured thereto, or may be manufactured as an integral portion of the handle 18.

The handle 18 is preferably of the full grip type and includes an index finger controlled on-off trigger switch 30. An electrical cord 32 may lead from a receptacle plug (not shown) to and then through the handle 18 to the switch 30, and thence to motor 14. Alternatively, a cordless motor may be used, in which case the switch 30 would be interconnected between a battery power source (perhaps positioned at the end of the motor 14 distal the transmission 16) and the motor 14.

Referring now to FIG. 5 in particular, the motor 10 is shown to be separately encased, i.e., the motor casing covers the motor alone. A hollow mounting block 34 is rigidly secured to the end of the motor casing out from which the motor shaft 36 projects. The mounting block 34 at least partially encloses an output shaft which may be the projecting end of the motor shaft 36, or an extension thereof, as illustrated. In FIG. 4 the output shaft is designated 38. It is tubular, and one end is adapted to snugly receive and engage the end portion of the motor shaft 36. A set screw 40 may be used for securing the output shaft 38 to the motor shaft 36.

The outer end of the mounting block 34 is planar (FIG. 4) and is perpendicular to the axis of output shaft 38. The transmission includes a support arm 42 that is secured to the end of mounting block 34 by means of a pair of machine screws 44 (FIG. 2). An enlarged opening 40 is provided through the inner or base end of a support arm 42, and the outer end portion of the output shaft 38 extends at least partially through such opening 50. As best shown by FIG. 4, a belt pulley 46, hereinafter referred to as drive pulley 46, is secured to the end of output shaft 38, such as by a machine screw 48 extending through the center of pulley 46 and threading into the tapped outer end portion of the central bore in shaft 38, for example. When installed, the drive pulley 46 is disposed on the side of support arm 42 that is distal the motor 14. As shown by FIG. 2, the support arm 42 extends generally radially outwardly from said support shaft. The longitudinal axis of the support arm 42 (about which it is symmetrically constructed), the rotational center of the motor and drive shaft assembly, the rotational center of the brush 10, and the plane of symmetry of the shield 12 are shown to all lie in a common plane, and the handle 18 is shown to extend generally normal to such plane.

A rotary chuck 52 is journaled at or near the end of support arm 42, such as by a sleeve bushing 54 concentrically positioned between an inner tubular shaft portion 56 of the chuck 52 and an outer cylindrical support sleeve 58 secured to the support arm 42. The output shaft 38 is drivingly connected with the chuck 54 by means of a combination of pulleys and belts, which includes drive pulley 46, and which will now be described in some detail.

A short pulley shaft 60 is journaled at an intermediate location on support arm 42, such as by a ball bearing assembly 62 inset into the arm 42. A pulley 64 is secured to the shaft 60 adjacent arm 42, and positioned to rotate in the same general plane with drive gear 36. A second pulley 66 is secured to shaft 60 outwardly adjacent the first pulley 64. Pulley 66 is paired with a pulley 68 secured to or formed integral with the tubular shaft 56 of chuck 54. A first belt 70 drivingly connects pulley 46 with pulley 64, and a second belt 72 drivingly connects pulley 66 with pulley 68. In this drive train the pulleys 46 and 66 are drive pulleys, and the pulleys 64 and 68 are driven pulleys.

The two drive pulleys 46, 66 are larger (approximately twice the diameter) than the two driven pulleys 66, 68. Thus, the belt and pulley drive means provides a two stage speed reduction from the motor 14 to the brush 10. This speed reduction is desirable in a power meat cleaner. However, in other types of power tools the transmission may involve a lower order speed reduction, or no speed reduction at all. Drive wheel 46 may be mated with driven wheel 68 and be directly connected therewith by a single belt, and pulleys 46, 68 may be of the same diameter. Also, in some power tools constructed according to the present invention it may be desirable to use chains and sprockets, or a system of gears in place of the belts and pulleys.

The transmission also includes an easily removable cover 74. It preferably includes an end wall 76 and a side wall 78 which in end opening configurations substantially matches the peripheral shape of the support arm 42. The cover opening may be properly sized so that it will frictionally grip the peripheral surface of support arm 42, and in that manner be retained on the support arm 42.

Referring to FIGS. 2 and 5, a pair of elongated slots 40 are provided in the base end of support arm 42, on opposite sides of the aforementioned opening 50, and are generally aligned across the arm 42 with each other and the opening 50. The machine screws 44 extend through these slots 80 and thread into tapped bores 82 provided for them in the end of mounting block 34 (FIG. 4). The slots 30 and the opening 50 are elongated in the direction of elongation of the support arm 42 (and the alignment of the pulleys 46, 64, 66, 68), so that the tension of belt 70 may be adjusted by simply longitudinally moving the support arm 42 before tightening the machine screws 44. The position of drive wheel 46 is fixed relative to the mounting block 34, and the position of the driven wheels 64 is fixed on the support arm 42. Thus tension in belt 70 may be increased by sliding support arm 42 outwardly, so as to move the driven wheel 64 away from drive wheel 46. The tension may then be retained in belt 70 by simply tightening the machine screw 44 before removing the force from support arm 42.

The shield 12 is very much like the one disclosed in my aforementioned U.S. Patent No. 2,959,797. It includes a pair of planar end walls 84, 86, and a generally semi-cylindrical rear wall 88 interconnected therebetween. It also includes a cleaning blade 90 positioned to longitudinally span the brush emergent side of the shield opening, and to substantially or lightly contact the periphery of the brush as it rotates out from the enclosure of the shield 12. For a further discussion of the function of the cleaning blade 90, and its relationship to the rotary brush 10, and of the most desirable construction, arrangement and use of the shield, reference is made to my aforementioned Patent No. 2,959,797.

In preferred form, the shield 12 is positively secured to the power assembly only by means of machine screws 92 or the like connecting the end wall 84 of shield 12 with the outer end portion of support arm 42. Also in preferred form, the stem portion 24 of tie plate 20 extends forwardly from the juncture of motor 14 and handle 18, and contacts and is a backstay for the shield 12. As shown by FIGS. 2 and 4, the backstay portion 94 of the tie plate 20 is angularly offset from the stem 24. It may include a backup pad 96 that is either formed separately and then secured to (as by riveting) the offset portion of the stem 20, or may be formed as an integral part of such offset portion 94. Either the rear wall 88 of the shield 12 or the backstay 94 is provided with a locating pin 98, and the other is provided with an opening 100 for snugly receiving and engaging the pin 98. It is preferred that the locating pin 98 be formed on the backstay, and the opening 100 be provided in the rear wall 88 of the shield 12.

Referring to FIGS. 1 and 5, and in review of the manner in which the various components are interconnected, the motor 14 is rigidly mounted on the tie plate 20, of which the backstay 94 is a part. The mounting block 34 is rigidly affixed to the motor 14, and the base end of the support arm 42 is rigidly secured to mounting block 34. The shield 12 is rigidly secured at end 84 to the outer end portion of support arm 42, and the shield 12 extends away from the support arm 42 in the same direction as mounting block 34 and motor 14, and is generally parallel to the motor 14. The backstay 94 rests against an intermediate portion of the rear wall 88 of shield 12. This arrangement provides the power tool has a box-like pattern of structural rigidity, commencing at the backstay 94, then extending rearwardly to the casing of motor 44, and from such casing through the mounting block 34 to the support arm 42, next through the support arm 42 to the shield 12 and finally from the shield 12 back to the backstay 94.

In use as a meat cleaner, the tool is held by one hand with the handle 18 generally horizontal, and generally parallel to the upper surface of a meat block 102. The handle is maintained in a substantially horizontal disposition as a pass of the tool is made over a piece of meat M on the meat block 102. As best illustrated by FIG. 2, when the handle 18 is substantially horizontal, the motor 14 is substantially aligned generally directly over or vertically above the shield 12 and the brush 10, and is generally symmetrically related to the shield 12.

In preferred form, the chuck 52 includes a holding pin 104 with a polyhedral or other off round cross-sectional shape. An opening 106 is provided in end wall 84 and is positioned to be aligned with the chuck 52 when the shield 12 is in place. One end of the brush 10 is provided with a tubular end support 108 having a central bore of a cross-sectional shape matching that of the holding pin 104.

With shield 12 in place, the brush 10 is installed by inserting the end support member 108 through the opening 106 and over the end portion of the holding pin 104. Then the brush 10 is swung into proper position in the shield 12, and a cap bearing 110, provided for journaling the end of brush 10 opposite the chuck 52, is screwed into a tapped opening for it in end wall 86 of shield 12. The cap bearing 110 includes a smooth bore axially aligned with the holding pin 104 into which cylindrical end support 112 at the end of brush 10 distal end support 108 fits.

In FIG. 6 the power tool is shown equipped with a sanding tool 10' in place of the meat cleaning brush 10. Such sanding tool 10' is drivingly connected to the chuck 52, and journaled at its opposite end, in the same manner as the meat cleaning brush 10. It is shown to comprise a sanding drum support cylinder 114, a pair of end pieces 116 positioned inside the support cylinder 114, at opposite end locations, and interconnected by a plurality of tie bolts 118. A sanding drum 120 surrounds the support cylinder 114.

A cylindrical buffing sleeve may be used on the cylinder 114 in place of the sanding drum 120. Also, a cylindrical chipper tool, or a wire cleaning brush, may be used as the rotary tool element of the power tool of this invention. Additional modifications include shifting the position of handle 18 axially of the shield 12 and the motor 14, towards the transmission 16 until it is in a balanced position with half of the weight of the power tool on one side of it, and the other half of the weight on its other side. The shield 12 may be rigidly secured to the backstay 94, such as by a pair of machine screws, instead of to the support arm 42. Also, the mounting block 34, and the support arm 42 carried thereby, may be rigidly secured to the tie plate 20, rather than to the casing of motor 14.

From the foregoing consideration of various aspects of the invention, other arrangements, adaptations and modifications of the invention will occur to those skilled in the art to which the invention is addressed, and are to be considered to be within the scope of the invention as defined by the following claims.

What is claimed is:

1. A portable power tool comprising a power assembly including a rotary motor having an output shaft, power transmission means having a support arm fixed relative to said motor, and extending generally radially outwardly from said output shaft, a rotary chuck at the end of said arm distal the output shaft, drive means drivingly connecting said output shaft with said chuck, and a handle extending generally perpendicularly from said motor, and including a finger operated on-off control for said motor; a removable rotary tool of cylindrical proportions having two coaxial end supports, at least one of which is engageable with said chuck; and a removable shield for enclosing a substantial portion of said tool, and including parallel first and second end walls, said first end wall including an opening, and said power tool further comprising means for rigidly, but removably, securing said first end wall, and in that manner the shield, to the support arm, in a position with the opening in such wall in registry with the chuck, and means carried by the second end wall of the shield for journaling the end support at the end of the rotary tool distal the chuck.

2. A power tool according to claim 1, including a backstay for said shield projecting forwardly from the juncture of said motor and said handle, and contacting the back of the shield.

3. A power tool according to claim 2, further including a location pin on either the backstay or the shield, and an opening in the other, in which the locating pin snugly fits.

4. A power tool according to claim 1, including a generally central tie plate, and wherein the motor is on one side of said tie plate, the handle is generally directly opposite the motor, on the other side of said tie plate, and said tie plate includes a forwardly projecting part that contacts and backstays the shield.

5. A power tool according to claim 1, including a hollow mounting block that at least partially encloses said output shaft, and is fixed relatively to the motor and to the handle, and wherein said support arm is secured to the outer end of said block, and includes an opening through which the output shaft extends, and said drive means comprises a drive pulley secured to the output shaft, outwardly of the support arm, and belt and pulley interconnecting said drive pulley and said chuck, and means mounted on the outward said of the support arm.

6. A power tool according to claim 5, wherein said belt and pulley means includes a driven pulley journaled on said support arm and a belt looped around both the drive and driven pulleys, the support arm includes a pair of slots spaced across such arm on opposite sides of said opening for the output shaft, which slots are elongated generally in the direction of alignment of said drive and driven pulleys, and the support arm is secured to the support block by a pair of machine screws which extends through the slots and screw into tapped sockets formed for them in the support block, said slots permitting movement of the support arm, and the driven pulley carried thereby, relative to the drive pulley, for the purpose of adjusting the tension of the belt.

7. A power tool according to claim 6, including a tie plate, and wherein the motor is mounted on one side of said tie plate, the handle is mounted generally opposite the motor on the other side of said tie plate, and said tie plate includes a forwardly projecting part that contacts and backstays the shield.

8. A portable power tool comprising a power assembly including a rotary motor having an output shaft, a power transmission means having a support arm fixed relative to said motor, and extending generally radially outwardly from said output shaft, a rotary chuck at the end of said arm distal the output shaft, drive means drivingly connecting said output shaft with said chuck, and a handle extending generally perpendicularly from said motor, and including a finger operated on-off control for said motor; a removable rotary tool of cylindrical proportions having two coaxial end supports, at least one of which is engageable with said chuck; and a removable shield for enclosing a substantial portion of said tool, and including parallel first and second end walls and a generally semi-cylindrical wall interconnected therebetween, said first end wall including an opening through which the end support at one end of the rotary tool and the chuck may be engaged, and said power tool further comprising a support member projecting forwardly from the juncture of said motor and said handle and contacting the shield, and means for rigidly, but removably, securing said shield to the power assembly, in a position with the opening in said first end wall in registry with the chuck, and means carried by the second end wall of the shield for journaling the end support at the end of the rotary tool distal the chuck.

9. A portable power tool according to claim 8, wherein the motor is separately encased, and is positioned rearwardly of, and substantially in parallelism with, said shield, and said handle is oriented such that when it is held in a substantially horizontal position the motor is generally vertically aligned above the shield, and a portion of the rotary tool is exposed below the shield for making a pass across a surface that is generally parallel with the handle.

References Cited

UNITED STATES PATENTS

| | | | |
|---|---|---|---|
| 1,325,937 | 12/1919 | Fox | 172—163 |
| 2,492,158 | 12/1949 | Le Compte et al. | 173—163 |
| 2,642,599 | 6/1953 | Habian | 15—24 |
| 2,750,610 | 6/1956 | Bloch | 15—23 |
| 3,012,441 | 12/1961 | Lamb et al. | 173—163 |

JAMES A. LEPPINK, *Primary Examiner.*